MAGNETIC SIGNAL STORAGE ARRANGEMENTS

Filed July 21, 1959 2 Sheets-Sheet 1

INVENTORS
BERNARD PATRICK COLLINS
DENNIS VIVIAN SHEPHERD
BY
Hane and Nydick
ATTORNEYS

MAGNETIC SIGNAL STORAGE ARRANGEMENTS

INVENTORS
BERNARD PATRICK COLLINS
DENNIS VIVIAN SHEPHERD
BY
Hane and Nydick
ATTORNEYS 3,032,884

MAGNETIC SIGNAL STORAGE ARRANGEMENTS

Bernard Patrick Collins and Dennis Vivian Shepherd, Stevenage, England, assignors to International Computers and Tabulators Limited Filed July 21, 1959, Ser. No. 828,477
Claims priority, application Great Britain Aug. 21, 1958
10 Claims. (Cl. 33—185)

This invention relates to a method of, and apparatus for, producing magnetic transducing assemblies employing a magnetic transducing head associated with a magnetic signal recording member and more particularly to the adjustment of magnetic signal transducing heads in such an assembly.

The spacing of the pole faces of a magnetic signal transducing head from the surface of a magnetic storage drum requires critical adjustment. As the spacing is reduced, the maximum pulse packing density is increased for recording and the amplitude of the playback signal is increased for reading. On the other hand, if the spacing is too small, there is a danger that the pole faces may come into contact with the recording surface of the drum and damage it. This contact may occur owing to slight unevenness of the drum surface, differential thermal expansion of the assembly etc. The spacings between the head and drum surface in practice are of the order of one to five thousandths of an inch, the particular spacing depending upon the design criteria and the purpose for which the storage drum assembly is to be used.

One method of adjustment consists in inserting a spacer, of a thickness equal to the desired spacing, between the pole faces and the drum surface and moving the head in a head mounting support until the pole faces are in contact with the spacer. This can be done only when the drum is stationary and is difficult to perform for small spacings. Another method utilises pneumatic gauging techniques well known in engineering measurement practice. A pneumatic gauging tube is built into the head mounting and this tube is connected to a standard pneumatic gauging arrangement so that the separation between the gauging tube and the drum surface may be measured continuously as the head mounting is adjusted in the support.

The pneumatic gauging method allows measurements to be made whilst the drum is rotating, which is an advantage. On the other hand, the gauging tube must be very accurately made to provide consistent results and must be positioned very accurately in relation to the pole faces of the signal transducing head, since it is desired to achieve a predetermined spacing of the pole faces from the drum surface, whereas it is the spacing of the end of the gauging tube from the drum which is actually being measured by the pneumatic gauging equipment. This requirement for accuracy of the tube and its positioning adds substantially to the cost of each head assembly.

It is the object of the invention to provide a simplified method of producing a magnetic storage drum assembly utilising a pneumatic gauging technique for positioning the magnetic transducing head in relation to the surface of the storage drum.

According to one feature of the invention a method of producing a magnetic transducing assembly in which a magnetic head assembly is accurately located at a desired separation from a magnetic record surface, consists in arranging adjacent to the record surface a common mounting holding the head assembly and a pneumatic gauging tube, the position of the gauging tube relative to the head assembly having previously been adjusted to give a pre-determined value of air pressure ratio when the head assembly is at a known distance from the surface, and adjusting the position of the mounting relative to the surface until a value of air pressure ratio indicative of the desired separation is obtained.

According to another feature of the invention a method of producing a magnetic transducing assembly in which a magnetic head assembly is accurately located at a desired separation from a magnetic record surface, consists in the steps of mounting the head assembly and a pneumatic gauging tube in a common mounting; arranging the common mounting with the head assembly in contact with the record surface, or with a surface simulating the record surface; adjusting the position of the gauging tube relative to the mounting to produce a first value of air pressure ratio for the gauging tube when the mounting is so arranged; and then adjusting the mounting relative to the record surface until a second air pressure ratio is obtained indicative of the desired separation between the head assembly and the record surface, the relationship between the pressure ratio and the separation of the gauging tube and the record surface being substantially linear between said two values of pressure ratio.

The mounting may be held in a setting jig to facilitate the adjustment of the gauging tube.

The invention will now be described, by way of example, with reference to the accompanying drawings, in which.

Figure 1:
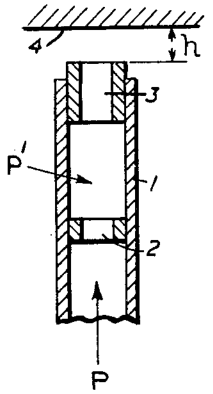
FIGURE 1 is a schematic diagram of a pneumatic gauging nozzle to illustrate the principle of measurement.
Figure 2:
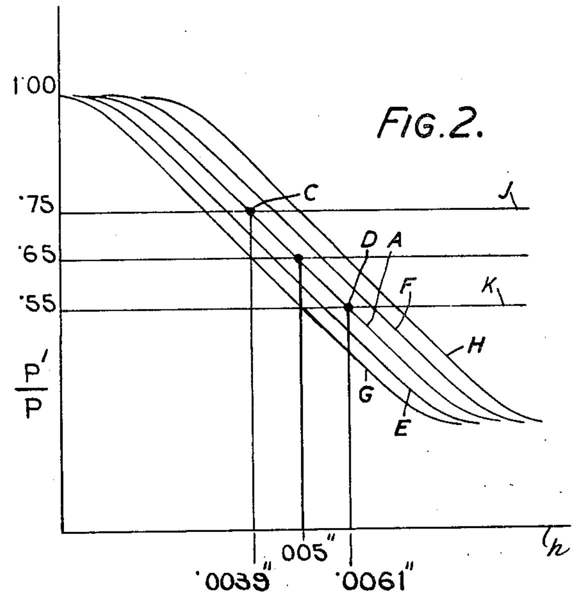
FIGURE 2 is a graph of pressure ratios against distance of a gauging nozzle from a gauging surface.

The essentials of a conventional pneumatic gauging system comprise a tube 1 (FIGURE 1), which contains a control orifice 2 and a gauging orifice 3, means for supplying air under pressure to the end of the tube remote from the orifice 3 and a measuring instrument for indicating the ratio between the pressure of the incoming air and the pressure of the air between the two orifices. If the gauging orifice is open to atmospheric pressure and is unrestricted, it will be apparent that the pressure P′ between the two orifices will be determined by the pressure P of the incoming air and by the relative dimensions of the two orifices. On the other hand, if the gauging orifice is moved towards a surface 4, the free flow of air will be restricted and P′ will increase. If $P'/P$ is measured for various values of $h$, the distance between the gauging orifice and the surface 4, a curve such as A (FIGURE 2) may be obtained by plotting the results.

It will be seen that the curve A has a relatively straight centre portion and over the section between points C and D, in a particular case, $h$ was linearly related to $P'/P$ within an accuracy of one percent. Thus an instrument measuring explicitly, or implicitly, the ratio $P'/P$ may be calibrated to indicate the distance $h$ over this linear range.

However, the actual value of $h$ required to produce a given value of $P'/P$ is greatly influenced by the internal and external diameters of the tube forming the gauging orifice 3.

For example, if the tolerance on these diameters is .001 inch then the calibration curve will lie somewhere between the bonding curves E and F. If the tolerance on the diameters is .002 inch then the calibration curve will lie between the bounding curves G and H. Three gauging tubes which nominally had the same diameter of gauging orifice, but were manufactured with a tolerance of .002 inch, might have calibration curves corresponding to the curves G, A and H, respectively. It will be seen that a pneumatic gauge reading of .65 for the value of $P'/P$ would correspond to values of $h$ of .0039 inch, .005 inch and .0061 inch for the curves G, A and H, respectively. If the gauge reading were used as an indication for setting the ends of the gauging tubes to .005 inch from the surface 4, only the tube having the calibration curve A would be set correctly, and the other two tubes would have an error in positioning of approximately 20%.

When a gauging tube is included in a magnetic head assembly to allow measurement of the spacing between the pole faces and the recording surface, another possible source of error is introduced. The pneumatic gauge will provide a reading indicative of the distance $h$ between the end of nozzle 17 (FIGURE 3) and the surface 18. However, the spacing which it is desired to measure is R, which is the distance between the pole faces of magnetic head 5 and the surface 18. Hence it is necessary to know to a high degree of accuracy the distance Q, the spacing between the plane of the end of the nozzle 17 and the tips of the pole faces, in order to relate the gauge reading to the distance R.

It will be apparent that each pneumatic gauging tube must be made with great accuracy and must also be accurately positioned with respect to the pole faces of the magnetic head, so that the calibration curve and the distance Q are as similar as possible for all head assemblies, if the spacing between the pole faces of the various assemblies and the associated recording surface is to be accurate to, say 5%. The need for such high accuracy clearly considerably increases the manufacturing costs of such a head assembly, as compared with a head assembly without gauging facilities.

The method of the invention utilises the fact that the slopes of the curves A, E, F, G and H are the same over the central part of the curves. It was noted above that all the curves have the same slope to an accuracy of approximately 1% over the portions lying between the lines J and K. A change in the value of $P'/P$ from .65 to .75 indicates a change of the value of $h$ from .005 inch to .0039 inch, that is a change in $h$ of .0011 inch, if the gauging tube calibration is represented by curve A. The same change in $P'/P$ will still indicate a change in $h$ of .0011 inch to an accuracy of 1% even if the calibration is represented by curve G or curve H. Thus changes in the value of $h$ can be measured accurately even though the absolute value of $h$ is not known accurately. This enables the distance R to be determined accurately by adjusting the gauging tube initially in each head assembly to give a standard value for $P'/P$ under test conditions. The whole head assembly may then be adjusted to such a position that a second standard value for $P'/P$ is obtained and the distance R is then determined with high accuracy.

The method of the invention is carried out in the following way. The pneumatic gauging tube is mounted in the head assembly in such a manner that it may be adjusted in a longitudinal direction relative to the head assembly. The head assembly is mounted in a jig, with the gauging tube connected to a conventional pneumatic measuring arrangement. The jig is provided with means for holding the head assembly relative to a gauging surface in a standard position and for adjusting the position of the gauging tube to produce a standard reading on the measuring arrangement. This gauging surface is a surface of the jig and is employed in an operation which effectively determines the distance Q as will be clear hereinafter. The head assembly is then removed from the jig, and mounted with the pole pieces of the head close to the drum. The position of the head assembly is then adjusted to produce a second standard reading on the pneumatic measuring arrangement which corresponds to the desired separation between the head and the drum.

The adjustment of the gauging tube takes place with the pole faces of the magnetic head in contact with a gauging surface so that variations in dimensions between the gauging tubes in different assemblies are taken into account without having to produce a calibration curve for each tube. The only requirement is that variations must not be so large that the first and second readings do not fall within the range of measurement which is linear to the required accuracy. Thus as long as the measurements lie on a part of the curve which falls between the lines J and K, the final positioning of the head will be accurate to one percent, for the conditions illustrated in FIGURE 2.

Figures 3, 4:
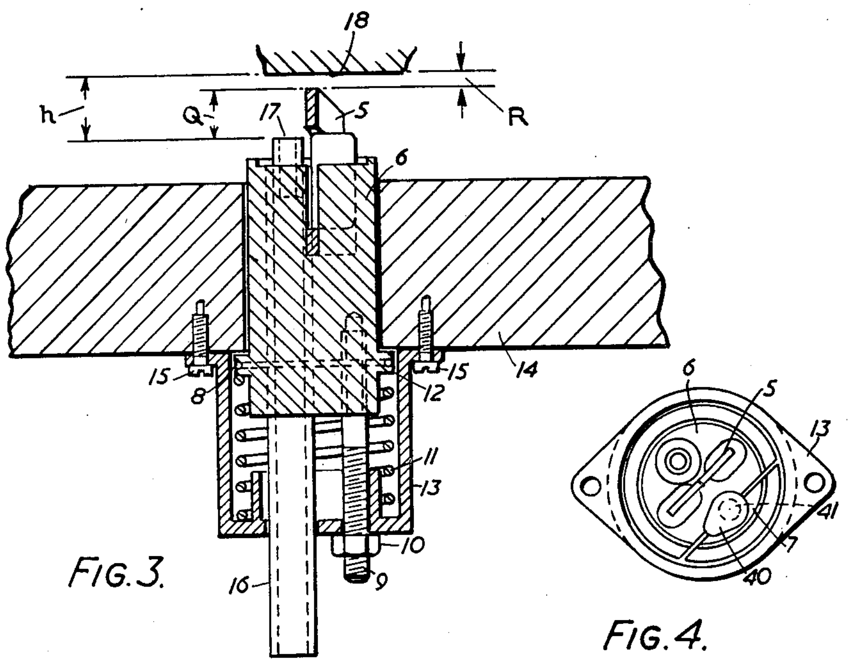
FIGURE 3 is a section view of a mounted magnetic head assembly.
FIGURE 4 is a plan view of a magnetic head assembly.

The detailed construction of one suitable form of magnetic head assembly will now be described. A magnetic head 5 consisting of a ferrite core with a coil wound thereon is held in a body member 6 (FIGURES 3 and 4). The body section 6 and a further section 7 are held together by a split ring 8, which lies within a groove in a projecting section 12 of each of the members. The member 6 carries a threaded rod 9 which passes through a hole in the bottom of an outer casing 13. The body members 6 and 7 tend to be moved out of the casing 13 by a spring 11, which is held inside the casing 13 between the projection 12 and the bottom of the casing. The body members are retained in the desired position within the outer casing by a nut 10 on the rod 9. The cylindrical outer casing 13 is provided with lugs to enable the casing to be attached to a fixed head mounting bar 14 by screws 15, the body members passing through a hole in the mounting bar. This mounting bar forms part of the magnetic drum frame.

An air tube 16 is mounted in the body member 6 and passes through a further hole in the outer casing 13. A pneumatic gauging nozzle 17 is mounted in the end of the air tube 16 adjacent to the magnetic head 5. The gauging nozzle 17 corresponds to the gauging orifice 3 of FIGURE 1. The gauging nozzle is press fitted in the air tube 16.

It was desired, in one particular magnetic drum assembly to adjust the position of the body member 6 so that the distance R (FIGURE 3) of the pole faces of the magnetic head from the surface 18 of a magnetic drum was .001 inch with a maximum error of .00025 inch. The gauging nozzle 17 measures the distance $h$ and it is therefore necessary that the method of adjustment should take into account the distance Q between the end of the gauging nozzle and the pole faces of the magnetic head 5 as well as any apparent differences in the measured value of $h$ caused by differences between the dimensions of different gauging nozzles.

Figures 5, 6, 7:
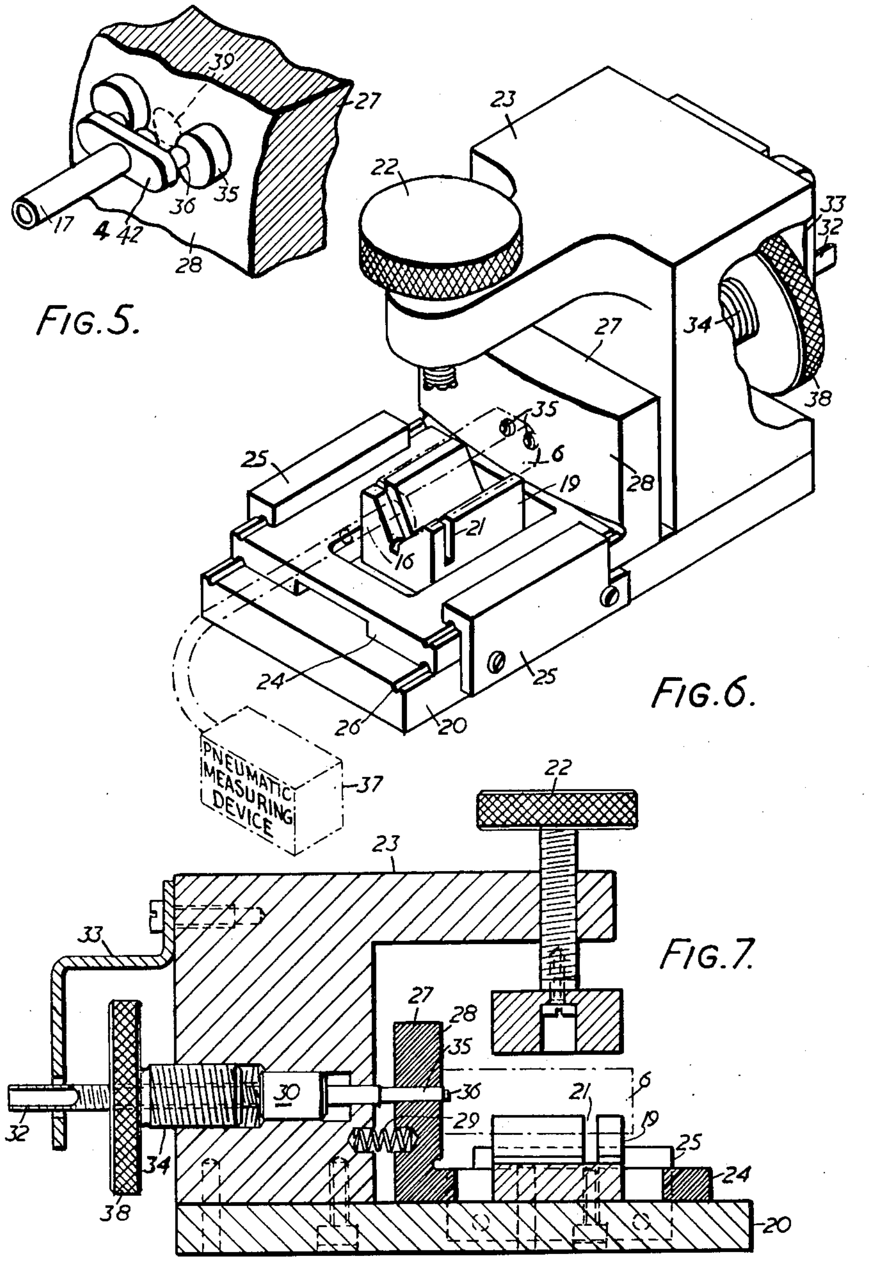
FIGURE 5 is a perspective view of a gauging nozzle removed from the head assembly.
FIGURE 6 is a perspective view of a jig for positioning the gauging nozzle in the head assembly.
FIGURE 7 is a sectional view of the positioning jig.

The arrangement of the head assembly as it is mounted on the drum has been described above. However, before being attached to the mounting bar 14, the head assembly is placed in a setting up jig (FIGURES 6 and 7). In this jig the distance corresponding to R is made equal to zero by holding the pole faces of the magnetic head 5 against a gauging surface 28 and the gauging nozzle 17 is moved relatively to the tube 16 to give a standard reading on a pneumatic measuring device 37. The adjusted head assembly is then mounted on the bar 14 and the body member 6 positioned by means of the nut 10 so that the pneumatic measuring device indicates the standard reading plus .001 inch. The working conditions are such that measurement takes place over those parts of the curves which lie between the lines J and K, FIGURE 2. Hence, this procedure will provide setting of the distance R to .001 inch with an accuracy determined only by the overall accuracy of the measuring system without any necessity for directly measuring or calibrating the distances $h$ and Q.

The body member 6, with the casing 13 and the member 7 removed, is placed in a V-shaped slot in a support block 19 (FIGURES 6 and 7) which is secured to the main base plate 20 of the setting jig. The body member 6 is located on the block 19 by the engagement of the projection 12 within a slot 21 in the block. The body member 6 is clamped on the block 19 by adjustment of a clamping screw 22 which passes through a threaded hole in a block 23, which is also secured to the base plate 20.

A slide 24 is free to move on the base plate 20 in the direction of the long axis of the body member 6. It is retained in position on the base plate 20 by brackets 25. The base plate, the slide and the brackets are provided with grooves 26 which house ball bearings so that the slide may move with the minimum amount of friction.

The gauging block 27 is a vertical extension of the slide 24. The gauging surface 28 of the block 27 is held lightly against the pole faces of the transducer head 5 by the pressure of coil spring 29 which urges the slide 24 towards the block 19. In this way the gap between the pole faces and the gauging surface is made zero, and the gauging nozzle may then be adjusted to obtain a standard reading on the pneumatic measuring device 37.

The initial positioning of the gauging surface relative to the pole faces of the head eliminates any need for accurate positioning of the body member 6 and prevents any errors arising from slight differences in the position of the head 5 relative to the member 6 which may occur in the different head assemblies. It may be convenient to provide a projection on the surface of the block 27 to engage the pole faces of the magnetic head, if the construction of the head assembly is such that the pole faces are nearly flush with the end of the member 6.

A differential screw movement is used to obtain the fine adjustment required for the setting of the gauging nozzle. A differential screw 34 has internal and external threads, of which the external thread has the coarser pitch. A screwed thrust rod 32 is threaded through the differential screw 34 to bear on a thrust block 30. The outer end of the thrust rod 32 has two parallel flats which are located in a slot in a bracket 33. Thus the thrust rod 32 is prevented from rotating, but can move axially when the differential screw 34 is turned by means of the knurled knob 38. The outer thread of the differential screw 34 engages a threaded hole in the block 23.

Clockwise rotation of the differential screw causes it to move into the block 23, but it also causes the thrust rod to move out of the differential screw 34. Since the external thread has a coarser pitch than the internal thread, the movement of the screw 34 is greater than that of the thrust rod 32, and the thrust rod moves the block 30 by an amount equal to the difference between the movement of the screw 34 within the block 23 and the movement of the rod 32 within the screw 34.

The thrust block 30 slides in a housing in the block 23. The thrust block 30 carries two plungers 35 which pass through holes in the block 23, and the gauge block 27. A small stud 36 is mounted eccentrically on the face of each plunger in a position to engage a flange 42 near the end of the nozzle 17 (FIGURE 5).

The area of the gauging surface 28 which co-operates with the nozzle 17 during measurement in indicated by a dotted circle 39 in FIGURE 5. The gauging surface preferably has the same curvature as the surface of the magnetic drum with which the head assembly is to be used, so that the conditions of measurement on the jig and on the drum are as closely similar as possible.

Before putting the head assembly in the jig, the gauging nozzle 17 is pressed into the air tube 16 so that the end of the nozzle is approximately level with the end of the pole faces of the transducer head 5. The body member 6 is then clamped on the block 19 by the screw 22 and the pneumatic measuring device 37 is attached to the outer end of the tube 16. By operation of the differential screw 34, the block 30 is moved to press the gauging nozzle 17 into the air tube 16 until the standard reading is obtained on the pneumatic measuring device 37.

As explained above, the method of measurement uses the difference between two standard readings to establish the correct adjustment of the head assembly. The actual distance of the nozzle 17 from the gauging surface 28 when the standard reading is obtained does not need to be known. If the nozzle dimensions are such that it would have the calibration curve A of FIGURE 2, the standard reading might be chosen as that corresponding to a distance of .005 inch between the nozzle and the gauging surface. Another nozzle with dimensions which would produce the calibration curve F of FIGURE 2, for example, would have to be moved further into the tube 16 and thus further away from the gauging surface than .005 inch to produce the standard reading on the measuring device 37.

It will be appreciated that the measuring device 37 is of the kind used for pneumatic gauging measurements in conventional engineering. For example, the measuring device available commercially under the name "Sigma Dialair" has been found to be suitable. The measuring device consists basically of a source of air at constant pressure which is applied to the control orifice, a differential indicator for measuring the ratio $P'/P$ and a connecting tube for applying the air passing through the control orifice to the air tube 16 on the head assembly.

The body member 6 is now removed from the jig, it is assembled with the member 7, and the casing 13 is replaced. The assembly is attached to the mounting bar 14 by the screws 15.

Before mounting the head assembly on the bar 14, the nut 10 is screwed inwards a short distance to draw the members 6 and 7 further into the casing 13. This ensures that the pole faces of the head do not come into contact with the drum surface during mounting of the head assembly. The measuring device 37 is re-connected to the air tube 16 and the nut 10 is slowly screwed outwards to allow the body members to move towards the drum, until the measuring device indicates a second standard reading. This second reading is so chosen that it represents an increment in the distance $h$ equal to the desired spacing between the pole faces of the head and the surface of the drum. In the present case, this increment is .001 inch. Hence, the attainment of the second standard reading indicates that the pole faces are spaced from the drum by the desired distance.

The head is provided with a wedge member 40 (FIGURE 4) which is accommodated in shaped slots in the members 7 and 6. The wedge is carried by a threaded rod 41 which is similar to the rod 9. The wedge is drawn inwards by tightening a nut (not shown) on the rod 41 to force apart the members 7 and 6 so that they grip the sides of the hole in the mounting bar 14. This enables the head assembly to be locked firmly in position after it has been adjusted in the manner described above.

This method of adjusting the spacing of the head from the drum does not require the gauging nozzle to be accurately positioned relative to the pole faces during manufacture, nor does it require great accuracy in the manufacture of the nozzle itself. Furthermore, it allows the adjustment of the head to take place with the drum either rotating or stationary, whichever is most convenient. In the latter case the recording surface is in motion laterally with respect to the head assembly while the final adjustment of the nut 10 is made. It will be apparent that the method is equally suitable for adjusting heads relative to the flat face of a magnetic disc store. The gauging surface 28 of the jig would then be made flat instead of curved. The same method is applicable to the adjustment of the heads of magnetic tape storage devices in which the heads are operated out of contact with the tape. The tape is fed between the head and a support, in the form of a drum, roller, or plate depending upon the particular construction of the storage device. The head may be adjusted relative to this support in the same manner as has been described in relation to the magnetic drum, that is, the support is treated as though it were the recording surface for purposes of adjustment of the head, the spacing being set to allow for the thickness of the magnetic tape.

Since the gauging surface 28 simulates the recording surface with which the head assembly is to be used, it will be apparent that the adjustment of the gauging tube could be carried out with the head assembly mounted adjacent to the record surface, rather than in the setting jig. The nut 10 is unscrewed to allow the head to be pressed against the recording surface by the spring 11, the gauging nozzle is adjusted to give the first gauge reading and the nut 10 is adjusted to move the head away from the recording surface until the second gauge reading is obtained. In this case, it may be more convenient to fix the nozzle in the air tube 16 and to make this tube a push fit in the body member 6. The adjustment can be carried out in this way only if the recording surface is such that it is damaged by the contact of the head during adjustment.

It will be apparent that other forms of head assembly may be used provided that they have provision for carrying an adjustable gauging nozzle and may be adjusted perpendicularly to the recording surface of the drum or disc. For example, the body member may be threaded to engage the internal threads of a tube, which is externally threaded to engage threads in the hole in the mounting bar 14, thus forming a differential screw adjustment for the head assembly.

We claim:

1. A method of producing a magnetic transducing assembly in which a magnetic head assembly is accurately located at a desired separation from a magnetic record surface, including the steps of mounting the head assembly and a pneumatic gauging tube in a common mounting, adjusting the position of the gauging tube relative to the head assembly to give a pre-determined value of air pressure ratio when the head assembly is at a known distance from the surface, supporting the mounting adjacent to the surface, and adjusting the position of the mounting relative to the surface until a value of air pressure ratio indicative of the desired separation is obtained.

2. A method of producing a magnetic transducing assembly in which a magnetic head assembly is accurately located at a desired separation from a magnetic record surface, by the steps of mounting the head assembly and a pneumatic gauging tube in a common mounting; arranging the common mounting with the head assembly in contact with the record surface; adjusting the position of the gauging tube relative to the mounting to produce a first value of air pressure ratio for the gauging tube when the mounting is so arranged; and then adjusting the mounting relative to the record surface until a second air pressure ratio is obtained indicative of the desired separation between the head assembly and the record surface, the relationship between the pressure ratio and the separation of the gauging tube and the record surface being substantially linear between said two values of pressure ratio.

3. A method as claimed in claim 1 in which the mounting is secured in a setting jig to facilitate adjustment of the gauging tube and after adjustment of the gauging tube is removed from the jig and is positioned adjacent to, but out of contact with, the record surface.

4. A method as claimed in claim 3, in which the record surface is in motion laterally with respect to the head assembly during adjustment of the mounting relative to the record surface.

5. A method as claimed in claim 1, in which the adjustment of the gauging tube is effected by moving a gauging nozzle in an air tube carried by the mounting.

6. A method of producing a magnetic transducing assembly in which a magnetic head assembly is accurately located at a selected separation from the surface of a record medium including the steps of locating the head assembly, carried by a mounting, at a known separation from a gauging surface, adjusting a pneumatic gauging tube orifice, carried by said mounting, relatively to the head assembly to a position in which said orifice is so spaced from the gauging surface that a first predetermined ratio is obtained between a substantially constant gaseous pressure and the gaseous pressure in the gauging tube adjacent said orifice, mounting said head assembly with the gauging tube orifice in fixed relation thereto adjacent the surface of the record medium and adjusting the head and orifice to a position relative to the record medium in which said orifice is so spaced from the record medium that a second predetermined pressure ratio is obtained, the difference between said first and second predetermined pressure ratios corresponding to the difference between said known and said selected separation.

7. A method of producing a magnetic transducing assembly in which a magnetic head assembly is accurately located at a selected separation from the surface of a record medium including the steps of locating the head assembly, carried by a mounting, with the head assembly in contact with a gauging surface, adjusting a pneumatic gauging tube orifice, carried by said mounting, relatively to the head assembly to a position in which said orifice is so spaced from the gauging surface that a first predetermined ratio is obtained between a substantially constant gaseous pressure and the gaseous pressure in the gauging tube adjacent said orifice, mounting said head assembly with the gauging tube orifice in fixed relation thereto adjacent the surface of the record medium and adjusting the head and orifice to a position relative to the record medium in which said orifice is so spaced from the record medium that a second predetermined pressure ratio is obtained, the difference between said first and second predetermined pressure ratios corresponding to the adjustment of the head assembly away from the surface by a distance equal to said selected separation.

8. A method of producing a magnetic transducing assembly in which a magnetic head assembly is accurately located at a selected separation from the surface of a record medium including the steps of locating the head assembly, carried by a mounting, in contact with the surface of the record medium, adjusting relatively to the head assembly a pneumatic gauging tube orifice carried by said mounting to a position in which said orifice is so spaced from the record medium that a first predetermined ratio is obtained between a substantially constant gaseous pressure and the gaseous pressure in the gauging tube adjacent said orifice, maintaining the position of the orifice relative to the head assembly and adjusting the position of the head such that the orifice is so spaced from the record medium that a second predetermined ratio is obtained, the difference between said first and second pressure ratios corresponding to the difference between said known and said selected separations.

9. A method of accurately locating a magnetic head assembly at a selected separation from the record surface of a magnetic transducing apparatus consisting in locating the head assembly, carried by a mounting, at a known separation from a gauging surface, adjusting the position relative to said gauging surface of a pneumatic gauging tube orifice adjustably carried by said mounting so as to obtain a first predetermined pressure ratio between a substantially constant gaseous pressure and the gaseous pressure in said tube adjacent the orifice thereof, maintaining the position of the orifice relative to the head, disposing said mounting so that the head assembly is adjacent the record surface and adjusting the position of the mounting relative to the record surface so that the spacing of the orifice from the record surface is such as to give a second predetermined pressure ratio, the difference between said first and second pressure ratios corresponding to the difference between said known and said selected separations.

10. Apparatus for adjusting the position of a pneumatic gauging tube orifice relative to a magnetic head assembly, said tube and head being carried in a common mounting, comprising means for holding said common mounting, a gauging surface freely movable towards the head, spring means urging said surface into contact with the head assembly and means to engage the gauging tube and move the orifice of the tube relative to the head assembly to adjust the spacing between the orifice and the gauging surface.

References Cited in the file of this patent

UNITED STATES PATENTS

| | | |
|---|---|---|
| 2,107,558 | Zimmerman | Feb. 8, 1938 |
| 2,612,566 | Anderson et al. | Sept. 30, 1952 |
| 2,747,152 | Greene | May 22, 1956 |
| 2,905,768 | Cronquist | Sept. 22, 1959 |
| 2,969,435 | Lynott | Jan. 24, 1961 |

FOREIGN PATENTS

| | | |
|---|---|---|
| 654,908 | Germany | Jan. 4, 1938 |